(12) United States Patent
von Cavallar et al.

(10) Patent No.: US 10,979,472 B2
(45) Date of Patent: Apr. 13, 2021

(54) DYNAMICALLY ALTERING PRESENTATIONS TO MAINTAIN OR INCREASE VIEWER ATTENTION

(71) Applicant: International Business Machines Corporation, Armonk, NY (US)

(72) Inventors: Stefan von Cavallar, Sandringham (AU); Timothy M. Lynar, Kew (AU); John M. Wagner, Plainville, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 123 days.

(21) Appl. No.: 15/279,942

(22) Filed: Sep. 29, 2016

(65) Prior Publication Data

US 2018/0091574 A1   Mar. 29, 2018

(51) Int. Cl.
| | |
|---|---|
| H04L 29/06 | (2006.01) |
| H04N 21/25 | (2011.01) |
| H04N 21/234 | (2011.01) |
| H04N 21/442 | (2011.01) |
| H04N 21/422 | (2011.01) |
| H04N 21/20 | (2011.01) |
| H04N 21/262 | (2011.01) |
| H04N 21/414 | (2011.01) |
| H04N 21/466 | (2011.01) |

(52) U.S. Cl.
CPC ......... *H04L 65/607* (2013.01); *H04N 21/20* (2013.01); *H04N 21/23418* (2013.01); *H04N 21/251* (2013.01); *H04N 21/26291* (2013.01); *H04N 21/41415* (2013.01); *H04N 21/4222* (2013.01); *H04N 21/44218* (2013.01); *H04N 21/4667* (2013.01); *H04L 67/42* (2013.01)

(58) Field of Classification Search
CPC ....... H04N 21/42202; H04N 21/44218; H04N 21/80; H04N 21/252; H04N 21/258; H04N 21/2668; H04N 21/40; H04N 21/458; H04N 21/4667; G06Q 50/30; G06Q 90/00
See application file for complete search history.

(56) References Cited

U.S. PATENT DOCUMENTS

| | | | | |
|---|---|---|---|---|
| 5,774,591 A | * | 6/1998 | Black ................. | G06K 9/00248 382/118 |
| 8,290,604 B2 | * | 10/2012 | Capio ................. | H04N 9/8205 700/94 |

(Continued)

OTHER PUBLICATIONS

"Camera Enabled Solution That Performs Audience Analytics", Kairos, Retrieved Sep. 28, 2016 from the World Wide Web: https://www.kairos.com/imrsv.

(Continued)

*Primary Examiner* — Dhairya A Patel
*Assistant Examiner* — Eui H Kim
(74) *Attorney, Agent, or Firm* — Cantor Colburn LLP; Joseph Petrokaitis

(57) ABSTRACT

Embodiments are directed to a computer-implemented method of displaying a presentation. The method includes analyzing a set of media files that include the presentation. Thereafter, each media file is displayed in a predetermined order. Upon the detection of an audience viewing the media files, the displaying of the media files is adjusted based on characteristics of the audience.

14 Claims, 5 Drawing Sheets

(56) References Cited

U.S. PATENT DOCUMENTS

| | | | | |
|---|---|---|---|---|
| 8,959,541 | B2* | 2/2015 | Conrad | H04N 21/6582 725/12 |
| 2007/0271518 | A1* | 11/2007 | Tischer | H04N 21/44222 715/744 |
| 2010/0328492 | A1* | 12/2010 | Fedorovskaya | G06Q 30/02 348/231.2 |
| 2012/0060176 | A1* | 3/2012 | Chai | H04H 60/45 725/10 |
| 2014/0040930 | A1* | 2/2014 | Gates, III | H04N 21/25891 725/13 |
| 2015/0053066 | A1* | 2/2015 | Hampiholi | G10H 1/0008 84/602 |
| 2015/0070516 | A1 | 3/2015 | Shoemake et al. | |
| 2015/0237412 | A1* | 8/2015 | Shimy | G11B 27/105 725/12 |
| 2016/0142774 | A1* | 5/2016 | Sayyadi-Harikandehei | H04N 21/458 725/14 |
| 2016/0188725 | A1* | 6/2016 | Wang | G06F 16/9535 707/734 |

OTHER PUBLICATIONS

"Digital Signage and Interactive Experiences", Acquire Digital, Retrieved Sep. 28, 2016 from the World Wide Web: http://acquiredigital.com/app-packs/Audience-Detect-Pack.pdf.

"Minority Report—Personal Advertising in the Future", Youtube, Accessed Sep. 28, 2016 from the World Wide Web: https://www.youtube.com/watch?v=7bXJ_obaiYQ.

Exeler et al, "eMir: Digital Signs that react to Audience Emotion", Informatik'09 2nd Workshop on Pervasive Advertising, 2009, http://www.joergmueller.info/pdf/PerAds09ExelerEmir.pdf.

Muller et al., "ReflectiveSigns: Digital Signs that Adapt to Audience Attention", Pervasive '09, 2009, http://w.pervasiveadvertising.org/pdf/Pervasive09MuellerReflectiveSigns.pdf.

* cited by examiner

DYNAMICALLY ALTERING PRESENTATIONS TO MAINTAIN OR INCREASE VIEWER ATTENTION

BACKGROUND

The embodiments described herein relate in general to the field of computing. More specifically, the embodiments described herein relate to systems and methodologies for displaying a presentation based upon the reactions of a viewer.

Presentations and other public displays are used to communicate information to the general public or interested individuals. The information is in many different forms, such as advertisements, safety bulletins, and other information that can be useful. Often, the information being displayed is predetermined. The content is shown at a particular time in a particular order. If the content is not useful to a content consumer at the moment the consumer is in visual range of the presentation, the consumer is more likely to ignore the content.

SUMMARY

Embodiments are directed to a computer-implemented method of displaying a presentation. The method includes analyzing a set of media files that include the presentation. Each media file is then displayed in a predetermined order. Upon the detection of an audience viewing the media files, the displaying of media files is adjusted, based on characteristics of the audience.

Embodiments are further directed to a computer system for displaying a presentation The system includes a memory and a processor system communicatively coupled to the memory. The processor is configured to perform a method that includes analyzing a set of media files that include the presentation. Each media file is then displayed in a predetermined order. Upon the detection of an audience viewing the media files, the displaying of media files is adjusted, based on characteristics of the audience.

Embodiments are further directed to a computer program product for displaying a presentation. The computer program product includes a computer-readable storage medium having program instructions embodied therewith, wherein the computer-readable storage medium is not a transitory signal per se. The program instructions are readable by a processor system to cause the processor system to perform a method that includes analyzing a set of media files that include the presentation. Each media file is then displayed in a predetermined order. Upon the detection of an audience viewing the media files, the displaying of media files is adjusted, based on characteristics of the audience.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
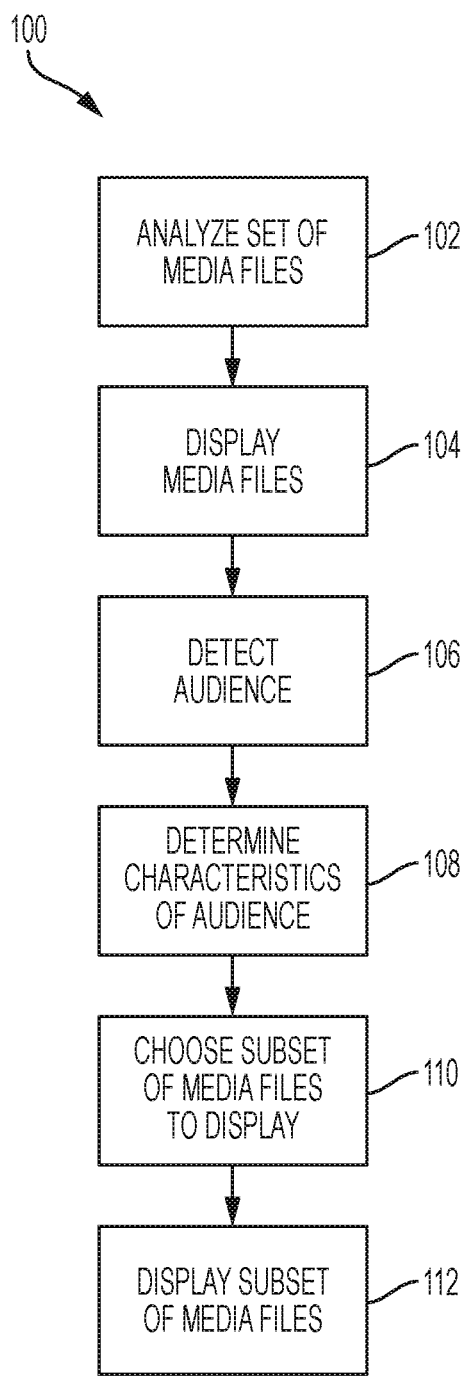
FIG. 1 depicts a flow diagram illustrating the operation of an exemplary embodiment.

In the accompanying figures and following detailed description of the described embodiments, the various elements illustrated in the figures are provided with three digit reference numbers. The leftmost digits of each reference number corresponds to the figure in which its element is first illustrated.

DETAILED DESCRIPTION

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of presentation algorithms is included herein, implementation of the teachings recited herein are not limited to embodiments described herein. Rather, embodiments are capable of being implemented in conjunction with any other type of presentation system, now known or later developed.

At least the features and combinations of features described in the immediately present application, including the corresponding features and combinations of features depicted in the figures amount to significantly more than implementing a method of dynamically altering presentations based on consumer feedback. Additionally, at least the features and combinations of features described in the immediately preceding paragraphs, including the corresponding features and combinations of features depicted in the figures go beyond what is well-understood, routine and conventional in the relevant field(s).

As discussed above, electronic public presentations featuring media content are becoming increasingly popular. With traditional printed signs, an entity purchases or leases space upon which to place an advertisement or other information. Examples of such signs can be seen on billboards, bus stops, public kiosks (such as in a shopping center), schools, and the like. A benefit of a printed sign is that it is relatively cheap to implement. A downside is that there is a limited space for printed signs and it takes time and labor in order to change the sign.

Electronic signs for presentations are an improvement to printed signs in several respects. For example, more than one entity can purchase or lease space on an electronic sign. Alternatively, one entity can present more information than would otherwise be possible with printed signs. This can be accomplished through the process of displaying a first piece of information (such as an advertisement or bulletin) for a period of time, then displaying a second piece of information for a different period of time. In addition, such electronic signage makes it easier to change the content being displayed. This feature allows an advertiser to quickly change an advertisement to reflect current sales (e.g., a one-day sale). This feature allows the quick dissemination of important news and other information (menus, registration information, news, schedule changes, etc.) that can be useful to potential viewers. Electronic signage also allows the display of information that otherwise would not be possible, such as a moving countdown, a video insert, current news or weather or sports scores, and the like.

One disadvantage of today's electronic signage is that there is no way to monitor the response to content displayed on the signage. While advertisements on a web page can be tracked by performance metrics such as click-through rate, it is not easy to determine if a particular message on electronic signage is effective or is even being viewed. Another disadvantage is that the electronic signage is typically predetermined. While the information displayed in a single media file being presented can be dynamic, the order of display of media files and the time that the media file is being displayed is typically fixed.

Embodiments of the present invention solve the above-described problem by using a novel method and system to analyze content to extract ideas and concepts from the content, detect the presence of an audience and its characteristics, and display appropriate content based on audience response. A presentation is displayed on display system. When an audience is detected, the presentation is altered depending on the composition of the audience. Aspects of the presentation that are favored by previous audiences of a similar composition can be emphasized. As the audience composition changes or as the audience shows interest or disinterest, the presentation can further adapt to the reaction of the audience.

Figure 5:
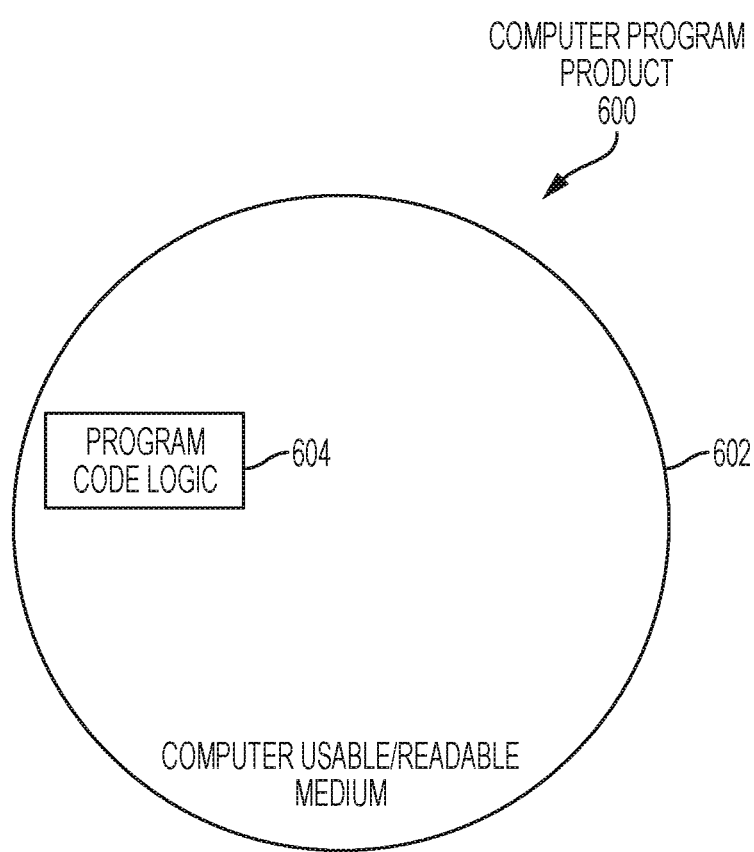
FIG. 5 depicts a diagram of a computer program product according to one or more embodiments.

Method 100 is an overview of a general method that accomplishes the above-described tasks. A flowchart illustrating a method 100 of implementing such an algorithm is presented in FIG. 1. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined or skipped. In some embodiments, portions of method 100 can be implemented by computer system 500 (FIG. 5).

A set of media files is loaded onto a system and analyzed (block 102). The system (described in further detail below) includes, inter alia, a processor unit, a display unit (which can include both a video display and one or more speakers for audio), and an input unit (for audio and/or video). The media files can contain the content to be displayed. A typical display unit can contain a monitor, projector, or television display, using technology such as DLP, IPS, LCD, LED, TFT, plasma, and the like. Large-scale display units, such as electronic billboards and other types of large electronic signage also can be used. The media file that is to be displayed can include one or more of video, audio, text, photos, or other images.

There can be a "default" setting where the selection of media files can be displayed in a predetermined order for a predetermined amount of time (block 104). In some embodiments, this can involve displaying each media file for a set amount of time, then displaying another media file from the set of media files. The content in the media files can be different for each use case. At a bus stop, the media files can contain information about the bus system (e.g., hours of operation, bus schedules, fees, and the like), about the city, news about nearby locations, advertisements about nearby locations, news, weather, and the like. At a mall kiosk, the media files might contain information about the mall (e.g., mall hours and a directory), menus from nearby restaurants, advertisements for nearby sales, general news and weather, and the like.

An audience is detected (block 106). The audience can be detected in one of a variety of different manners. There can be a video input interface that receives a video input from a camera, video camera, or other video gathering device or image capture device. The video gathering device can be a device that receives light from the visible wavelengths. The video gathering device can be a device that gathers infrared light. The video gathering device can be a device with night detection capabilities. There can be more than one video gathering device, in which case each video gathering devices can be of a different type or each be the same type or a mix of two (or more) different types of devices. There can be an audio input interface that receives an audio input from one or more microphones. Detecting an audience can include analyzing images from the video input to detect presence information. Changes to the video image can be indicative of a new audience.

In addition, there can be devices that detect the presence of electronic signals, such as those from a smartphone. In some embodiments, there can be an "app" that allows consumers to opt in to detection. When the app is in proximity to the display system, information can be transmitted to the system. This information can be transmitted in one of a variety of different manners. In some embodiments, each app has a serial number or other unique identifier. When an app is loaded on a mobile electronic device that is within proximity of a system containing an embodiment of the present invention, there can be communication between the system and the mobile electronic device, such as via cellular technology, internet protocol (IP) technology, Bluetooth, WiFi, near field communication, or other communication methods. Even if a consumer has not downloaded the app, the presence of their electronic device can be detected and used to indicate that an audience is in proximity to the display. Other methods also can be used, both those currently known or developed in the future.

Characteristics of the audience are determined (block 108). Characteristics being determined can include the number of people in the audience, gender, approximate age, and indicated interest. This can occur in one of a variety of different manners. For example, currently known facial recognition algorithms, eye tracking algorithms, and the like can be implemented to determine many of the above-described features by analyzing the video input feed. The embodiment described above with the mobile app also can be used to determine characteristics. In some embodiments, the consumer will have provided some demographic information to the app.

Characteristics of the audience also can include the audience's reaction to the media file. Algorithms such as facial recognition, body-language tracking, and eye tracking can be used to provide an estimated level of interest in the media file. Such information can be stored for later use.

A subset of media files is chosen to be presented to the audience (block 110). The subset of media files is then displayed to the audience via the display unit (block 112).

Figure 2:
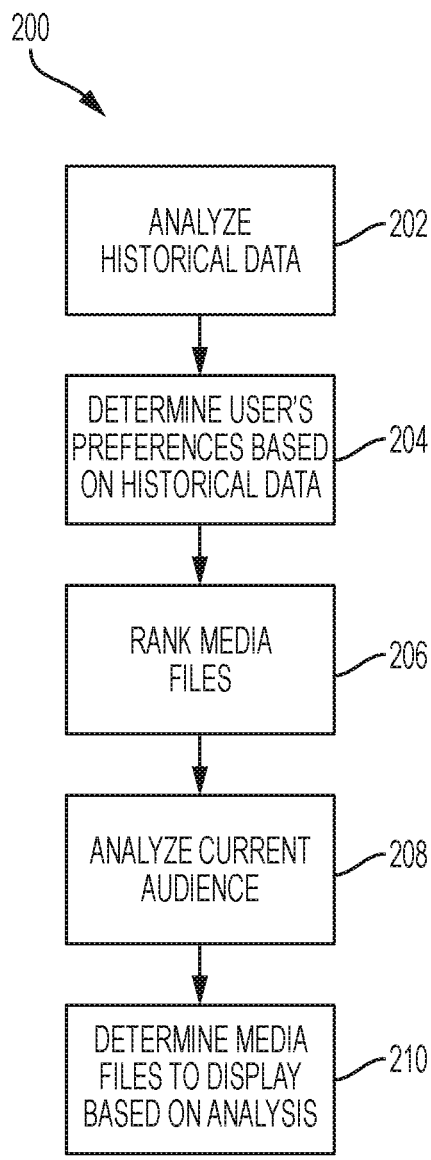
FIG. 2 depicts a flow diagram illustrating the operation of an exemplary embodiment.

The process of choosing the media files (block 102) is described in further detail in FIG. 2 with respect to method 200. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped. In some embodiments, portions of method 200 can be implemented by computer system 500 (FIG. 5).

As described above with respect to block 102, during the analysis phase, each media file is analyzed in a variety of different manners. The type of media file can be determined. Semantic analysis can be performed to on text documents to determine the content of the media file. Metadata can be obtained from video, audio, or image files, either pre-loaded with the media files, or determined during the analysis using one of a variety of different techniques known in the art or developed in the future. The techniques can include an analysis of audio files to determine the content of the audio file (using song matching techniques, for example). Similar techniques can be used for images and videos.

The result of the analysis is that the system knows what is contained in each media file. Meta data about each media file can contain bibliographic information, such as the author, source, title, and other relevant information. The semantic analysis of text files can be used for the extraction of ideas and content from each media file.

Historical regarding each media file is analyzed (block 202). Historical data includes data regarding previous showing of each media file in the set of media files. In some embodiments, one or more media files can be considered to be a group and analyzed together. This can be done by analyzing media files for similarity or if the media files were set to be displayed as a group. The analysis can be used to determine which media file resulted in the best performance with the given audience. For example, historical data might show that an audience of primarily males might have a different reaction to certain media files than an audience of primarily females. Other aspects, such as an estimated age, can also be used to demographically categorize members of the audience and the reactions to a particular media file.

Historical data can also be used to determine which media files have already been presented to this particular audience (block 204). Thus, even if there is a very effective media file in the set of media files, if that media file has already been displayed to the audience, it is less likely to be shown to the audience again.

Each media file can then be compared to each other to determine a ranking or a similarity score (block 206). This ranking can take into consideration the information about the audience. The ranking can be in the form of a plurality of vectors that indicate a score or rating for each media file for each demographic for which data is available. The analysis described above is used to determine how related certain media files are to each other.

The current audience (the one in proximity with the display) is analyzed to determine demographic information described above (block 208). In some embodiments, a set of vectors can be created for the current audience, with each vector representing an audience member or a characteristic of one of the audience members.

The vectors for the audience members can be compared to the vectors for the media files to determine which media files to display to the consumers (block 210). A variety of different techniques can be used to make this determination, such as similarity scores, machine learning algorithms and the like. The result is that media files that have been shown to be effective at gaining the interest of an audience with a particular composition will be shown more often if another audience with a similar composition comes into proximity of a display unit.

Figure 3:
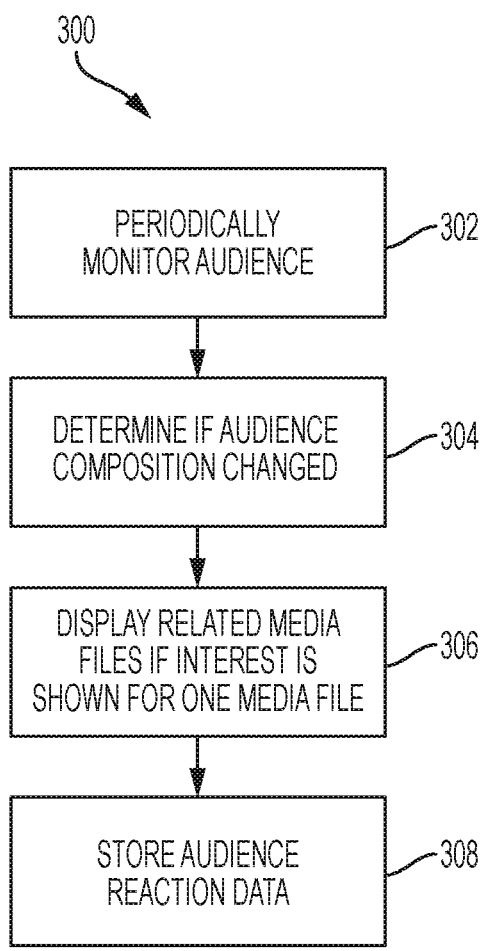
FIG. 3 depicts a flow diagram illustrating the operation of an exemplary embodiment.

Once a selection of media files is selected and starts to begin, a dynamic, real-time response to the audience can occur. This is described in conjunction with FIG. 3. Method 300 is merely exemplary and is not limited to the embodiments presented herein. Method 300 can be employed in many different embodiments or examples not specifically depicted or described herein. In some embodiments, the procedures, processes, and/or activities of method 300 can be performed in the order presented. In other embodiments, one or more of the procedures, processes, and/or activities of method 300 can be combined or skipped. In some embodiments, portions of method 300 can be implemented by computer system 500 (FIG. 5).

Method 300 describes the process by which the media files being presented can be changed in an attempt to maintain or increase the attention of the audience. While the media files are being displayed in a manner described above, the audience is being periodically monitored (block 302). This can occur by analyzing video, image, and audio inputs to determine the composition and reactions of the audience. If the audience composition changes (e.g., someone leaves the audience or someone joins the audience), method 200 can be executed again to determine if the media files being displayed should be changed (block 304).

If the audience shows particular interest in one or more media files, related media files can be found and displayed (block 306). The audience can show interest in a variety of different manners. As stated before, there can be image, video, and audio capturing devices located near the display. Those capturing devices can detect movements of the audience. The audience can display interest through facial expressions (e.g., looking concerned versus looking interested versus looking board), through movement (e.g., pointing at areas of the display), or even by merely turning to view the display. Each such movement, gesture, facial expression, or other indication of interest can be determined and stored.

As stated above, each media file in the set of media files is analyzed (see, e.g., FIG. 2). As part of the process, metadata information regarding each media file is stored in a database. The metadata information can include topic and subject information. There can also be a similarity score calculated between each media file in the set of media files. If a consumer shows interest in one particular media file, the similarity score can be used to find the media files that are closest in similarity to the media file in which the audience is showing interest. In such a manner, the presentation being displayed can change based on the reaction of the audience.

One or more vectors concerning these movements and gestures can be represented (such as in a vector form) and stored in a database (block 308) along with demographic information about who is having the reaction. Both positive and negative reactions can be saved in the database. In such a manner, in addition to being able to dynamically change the media files being shown to the audience, the media files are constantly being scored and adjusted to improve the accuracy of future showings.

The weightings of the audience reactions can occur in one of a variety of different manners. In some embodiments, the reaction of an audience as a whole can be of primary importance. Thus, a negative reaction of a single individual might not be weighted as much as a positive reaction of a larger audience. In either case, once the reactions are stored in a database, they can be incorporated into the process of selecting media files based on audience composition and reaction to maintain or increase the attention of the viewers.

Figure 4:
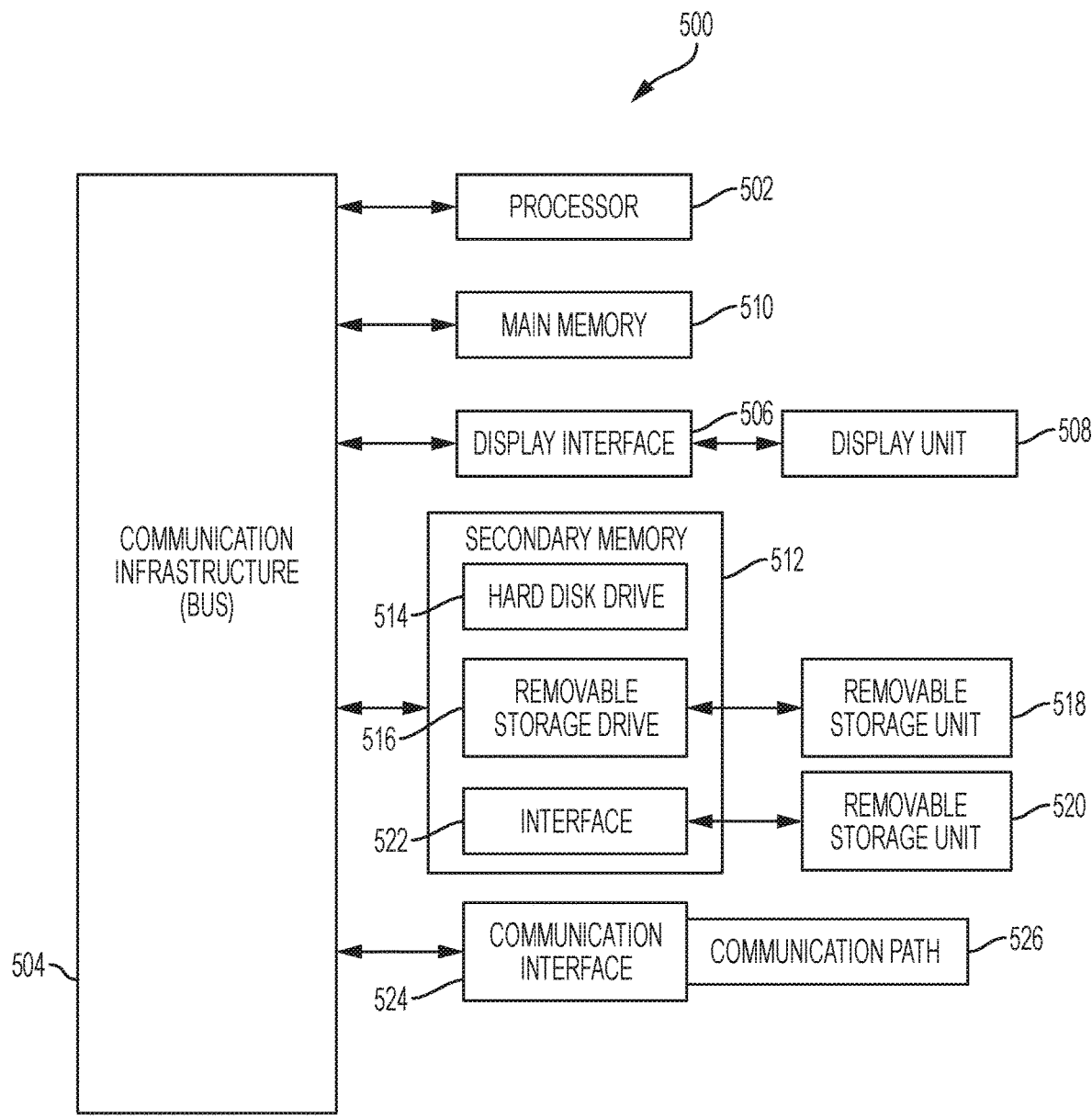
FIG. 4 depicts a computer system capable of implementing hardware components of one or more embodiments.

FIG. 4 depicts a high-level block diagram of a computer system 500, which can be used to implement one or more embodiments. More specifically, computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512. Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Referring now to FIG. 5, a computer program product 600 in accordance with an embodiment that includes a computer-readable storage medium 602 and program instructions 604 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the consumer's computer, partly on the consumer's computer, as a stand-alone software package, partly on the consumer's computer and partly on a remote computer or entirely on the remote computer or server. In the latter scenario, the remote computer can be connected to the consumer's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer implemented method of displaying a presentation, the method comprising:
analyzing, using a processor, a set of media files that comprise the presentation to generate, by a machine learning algorithm executed by the processor, a media file vector for each media file in the set of media file, the vector comprising a plurality of characteristics extracted from each media file in the set of media files;
displaying, using the processor, the presentation, wherein each media file in the set of media files is in a predetermined order while displaying the presentation;
detecting, using the processor, an audience comprising a plurality of members while viewing the presentation, wherein detecting the audience comprises capturing electronic signals transmitted by a plurality of mobile devices in close proximity to the processor and establishing at least one communication session with the plurality of mobile devices;

determining demographic information for each audience member in the plurality of audience members based on the establishing the at least one communication session with the plurality of mobile devices, wherein the demographic information is stored in a mobile application on each mobile device in the plurality of mobile devices;

generating an audience member vector for each audience member in the plurality of audience members, the audience member vector comprising a plurality of member characteristics extracted from the demographic information for each audience member; and adjusting, using the processor, the displaying of media files from the set of media files based on the audience, wherein adjusting, using the processor, the displaying of media files from the set of media files based on the audience comprises:

obtaining historical data relating to the set of media files and the audience;

comparing the audience member vector to the media file vector to determine a subset of media files based on a distance between the audience member vector and the media file vector;

dynamically adjusting the displaying of the subset of media files from the set of media files in an order determined based on the distance between the audience member vector and the media file vector and historical data relating to the set of media files and the audience;

wherein the historical data comprises information indicative of whether one or more of the plurality of members has been shown one or more of the media files of the set of media files in the past;

wherein adjusting the displaying of the subset of media files from the set of media files based on the audience further comprises:

monitoring the audience periodically;

determining that a first audience member is having a positive reaction to the media file of the subset of media files being displayed;

determining that a second audience member is having a negative reaction to the media file of the subset of media files being displayed, wherein the positive reaction is weighted heavier than the negative reaction;

determining one or more media files that are related to the media file being displayed based on the positive reaction; and adjusting the subset of media files to display the one or more media files that are related to the media file being displayed.

2. The computer implemented method of claim 1, wherein:
analyzing the set of media files comprises:
determining, using the processor, the content of each media file in the set of media files; and
evaluating, using the processor, each media file in one or more categories.

3. The computer implemented method of claim 1, wherein:
detecting the audience viewing the media files comprises:
using a video gathering device to capture images; and
analyzing the images to detect the presence of the plurality of members.

4. The computer implemented method of claim 3, wherein:
analyzing the images to detect the presence of the plurality of members comprises using algorithms chosen from the following: facial recognition, eye-tracking, and body-language tracking.

5. The computer implemented method of claim 3, wherein:
detecting the audience viewing the media files further comprises:
determining characteristics of the audience, the characteristics including one or more of the following: number of people in the audience, approximate age of each person in the audience, gender of the people in the audience.

6. The computer implemented method of claim 5, wherein:
adjusting the displaying of media files from the set of media files based on the audience comprises:
determining a subset of media files from the set of media files, wherein the subset of media files is selected based on the characteristics of the audience; and
causing the display of the subset of media files from the set of media files, in an order determined based on the characteristics of the audience.

7. The computer implemented method of claim 6, wherein:
determining the subset of media files further comprises:
assigning one or more vectors based on characteristics of each audience member;
assigning one or more vectors based on the content of the media files;
analyzing historical data regarding characteristic vectors to determine a similarity score comparing the audience with each media file of the set of media files; and
determining the subset of media files by using the similarity score.

8. A computer system for displaying a presentation, the system comprising:
a memory; and
a processor system communicatively coupled to the memory;
the processor system configured to perform a method comprising:
analyzing a set of media files that comprise the presentation to generate, by a machine learning algorithm executed by the processor, a media file vector for each media file in the set of media file, the vector comprising a plurality of characteristics extracted from each media file in the set of media files;
displaying the presentation wherein each media file in the set of media files is in a predetermined order while displaying the presentation;
detecting an audience comprising a plurality of members while viewing the presentation, wherein detecting the audience comprises capturing electronic signals transmitted by a plurality of mobile devices in close proximity to the processor and to establish at least one communication session with the plurality of mobile devices, wherein the demographic information is stored in a mobile application on each mobile device in the plurality of mobile devices;
determining demographic information for each audience member in the plurality of audience members based on the establishing the at least one communication session with the plurality of mobile devices;
generating an audience member vector for each audience member in the plurality of audience members, the audience member vector comprising a plurality of member characteristics extracted from the demographic information for each audience member; and
adjusting the displaying of media files from the set of media files based on the audience, wherein adjusting the displaying of media files from the set of media files based on the audience comprises;
 obtaining historical data relating to the set of media files and the audience;
 comparing the audience member vector to the media file vector to determine a subset of media files based on a distance between the audience member vector and the media file vector;
 dynamically adjusting the displaying of the subset of media files from the set of media files in an order determined based on the distance between the audience member vector and the media file vector and historical data relating to the set of media files and the audience;
wherein the historical data comprises information indicative of whether one or more of the plurality of members has been shown one or more of the media files of the set of media files in the past;
wherein adjusting the displaying of the subset of media files from the set of media files based on the audience further comprises:
 monitoring the audience periodically;
 determining that a first audience member is having a positive reaction to the media file of the subset of media files being displayed;
 determining that a second audience member is having a negative reaction to the media file of the subset of media files being displayed, wherein the positive reaction is weighted heavier than the negative reaction;
 determining one or more media files that are related to the media file being displayed based on the positive reaction; and
 adjusting the subset of media files to display the one or more media files that are related to the media file being displayed.

9. The computer system of claim 8, wherein:
detecting the audience viewing the media files comprises:
 using a video gathering device to capture images;
 analyzing the images to detect the presence of the plurality of audience members by using algorithms chosen from the following: facial recognition, eye-tracking, and body-language tracking; and
 determining characteristics of the audience, the characteristics including one or more of the following: number of people in the audience, approximate age of each person in the audience, gender of the people in the audience.

10. The computer system of claim 9, wherein:
adjusting the displaying of media files from the set of media files based on the audience comprises:
 determining a subset of media files from the set of media files, wherein the subset of media files is selected based on the characteristics of the audience; and
 causing the display of the subset of media files from the set of media files, in an order determined based on the characteristics of the audience.

11. The computer system of claim 10, wherein:
determining the subset of media files further comprises:
 assigning one or more vectors based on characteristics of each audience member;
 assigning one or more vectors based on the content of the media files;
 analyzing historical data regarding characteristic vectors to determine a similarity score comparing the audience with each media file of the set of media files; and
 determining the subset of media files by using the similarity score.

12. A computer program product of displaying a presentation comprising:
a computer-readable storage medium having program instructions embodied therewith, wherein the computer-readable storage medium is not a transitory signal per se, the program instructions readable by a processor system to cause the processor system to perform a method comprising:
 analyzing a set of media files that comprise the presentation to generate, by a machine learning algorithm executed by the processor, a media file vector for each media file in the set of media file, the vector comprising a plurality of characteristics extracted from each media file in the set of media files;
 displaying the presentation wherein each media file in the set of media files is in a predetermined order while displaying the presentation;
 detecting an audience comprising a plurality of members while viewing the presentation, wherein detecting the audience comprises capturing electronic signals transmitted by a plurality of mobile devices in close proximity to the processor and to establish at least one communication session with the plurality of mobile devices, wherein the demographic information is stored in a mobile application on each mobile device in the plurality of mobile devices;
 determining demographic information for each audience member in the plurality of audience members based on the establishing the at least one communication session with the plurality of mobile devices;
 generating an audience member vector for each audience member in the plurality of audience members, the audience member vector comprising a plurality of member characteristics extracted from the demographic information for each audience member; and
 adjusting the displaying of media files from the set of media files based on the audience, wherein adjusting the displaying of media files from the set of media files based on the audience comprises:
  obtaining historical data relating to the set of media files and the audience;
  comparing the audience member vector to the media file vector to determine a subset of media files based on a distance between the audience member vector and the media file vector;
  dynamically adjusting the displaying of the subset of media files from the set of media files in an order determined based on the distance between the audience member vector and the media file vector and historical data relating to the set of media files and the audience;
 wherein the historical data comprises information indicative of whether one or more of the plurality of members has been shown one or more of the media files of the set of media files in the past;

wherein adjusting the displaying of the subset of media files from the set of media files based on the audience further comprises:
  monitoring the audience periodically;
  determining that a first audience member is having a positive reaction to the media file of the subset of media files being displayed;
  determining that a second audience member is having a negative reaction to the media file of the subset of media files being displayed, wherein the positive reaction is weighted heavier than the negative reaction;
  determining one or more media files that are related to the media file being displayed based on the positive reaction; and
  adjusting the subset of media files to display the one or more media files that are related to the media file being displayed.

13. The computer program product of claim 12, wherein: analyzing the set of media files comprises:
  determining, using the processor, the content of each media file in the set of media files; and
  evaluating, using the processor, each media file in one or more categories.

14. The computer program product of claim 12, wherein: detecting the audience viewing the media files comprises:
  using a video gathering device to capture images;
  analyzing the images to detect the presence of the plurality of audience members using algorithms chosen from the following: facial recognition, eye-tracking, and body-language tracking; and
  determining characteristics of the audience, the characteristics including one or more of the following: number of people in the audience, approximate age of each person in the audience, gender of the people in the audience;
wherein adjusting the displaying of media files from the set of media files based on the audience comprises:
  determining a subset of media files from the set of media files, wherein the subset of media files is selected based on the characteristics of the audience; and
  causing the display of the subset of media files from the set of media files, in an order determined based on the characteristics of the audience.

* * * * *